US008995503B2

(12) United States Patent
Kim et al.

(10) Patent No.: US 8,995,503 B2
(45) Date of Patent: Mar. 31, 2015

(54) METHOD AND APPARATUS OF SELECTING TRANSMISSION/RECEPTION MODE OF PLURAL TRANSMISSION/RECEPTION PAIRS

(75) Inventors: Young-Doo Kim, Seoul (KR); Seok Hwan Park, Goyang-si (KR); Hae Wook Park, Seoul (KR); Inkyu Lee, Seoul (KR)

(73) Assignees: Samsung Electronics Co., Ltd., Suwon-si (KR); Korea University Industrial & Academic Collaboration Foundation, Seoul (KR)

( * ) Notice: Subject to any disclaimer, the term of this patent is extended or adjusted under 35 U.S.C. 154(b) by 657 days.

(21) Appl. No.: 12/830,278

(22) Filed: Jul. 2, 2010

(65) Prior Publication Data

US 2011/0059765 A1 Mar. 10, 2011

(30) Foreign Application Priority Data

Sep. 9, 2009 (KR) ........................ 10-2009-0084767

(51) Int. Cl.

| | |
|---|---|
| ***H04B 1/38*** | (2006.01) |
| ***H04L 5/16*** | (2006.01) |
| ***H04W 28/22*** | (2009.01) |
| ***H04B 7/02*** | (2006.01) |
| ***H04B 7/04*** | (2006.01) |
| *H04W 52/40* | (2009.01) |

(52) U.S. Cl.

CPC ............... *H04W 28/22* (2013.01); *H04B 7/024* (2013.01); *H04B 7/0452* (2013.01); *H04W 52/40* (2013.01)

USPC ............................ 375/219; 375/225; 375/259

(58) Field of Classification Search

USPC ......... 375/219, 222, 224, 225, 259–260, 295, 375/316; 370/241, 252

See application file for complete search history.

(56) References Cited

U.S. PATENT DOCUMENTS

| | | | | |
|---|---|---|---|---|
| 8,218,667 | B2 * | 7/2012 | Lee et al. | 375/267 |
| 2005/0094598 | A1 | 5/2005 | Medvedev et al. | |
| 2005/0250544 | A1 * | 11/2005 | Grant et al. | 455/562.1 |
| 2006/0067417 | A1 * | 3/2006 | Park et al. | 375/260 |
| 2006/0160495 | A1 * | 7/2006 | Strong | 455/101 |

(Continued)

FOREIGN PATENT DOCUMENTS

| | | |
|---|---|---|
| JP | 2009-038447 | 2/2009 |
| KR | 10-2005-0075650 | 7/2005 |

(Continued)

OTHER PUBLICATIONS

Jorswieck, Eduard A. et al. “Complete Characterization of the Pareto Boundary for the MISO Interference Channel” IEEE Transaction on Signal Processing, vol. 56, No. 10, Oct. 2008, pp. 5291-5296 (6 pages, in English).

(Continued)

*Primary Examiner* — Jean B Corrielus

(74) *Attorney, Agent, or Firm* — NSIP Law

(57) ABSTRACT

An achievable sum data rate with respect to each of available candidate transmission/reception modes may be calculated to select a transmission/reception mode of transmission/reception pairs repeatedly using radio resources. A transmission/reception mode to be applied may be selected from the candidate transmission/reception modes based on the calculated sum data rate. Information associated with the selected transmission/reception mode may be shared by the transmission/reception pairs.

16 Claims, 9 Drawing Sheets

(56) References Cited

U.S. PATENT DOCUMENTS

| | | | | |
|---|---|---|---|---|
| 2008/0075007 | A1 * | 3/2008 | Mehta et al. | 370/238 |
| 2008/0107085 | A1 * | 5/2008 | Yoon | 370/333 |
| 2008/0125051 | A1 * | 5/2008 | Kim et al. | 455/67.13 |
| 2008/0316935 | A1 * | 12/2008 | Bala et al. | 370/252 |
| 2009/0046594 | A1 * | 2/2009 | Zhou et al. | 370/252 |
| 2009/0066577 | A1 | 3/2009 | Kim et al. | |
| 2009/0227249 | A1 * | 9/2009 | Ylitalo | 455/424 |
| 2009/0268840 | A1 * | 10/2009 | Clerckx et al. | 375/267 |
| 2009/0322613 | A1 * | 12/2009 | Bala et al. | 342/373 |
| 2009/0323619 | A1 * | 12/2009 | Tajer et al. | 370/329 |
| 2010/0034107 | A1 * | 2/2010 | Chin et al. | 370/252 |
| 2010/0075672 | A1 * | 3/2010 | Jwa et al. | 455/434 |
| 2010/0330928 | A1 * | 12/2010 | Prasad et al. | 455/69 |
| 2011/0021206 | A1 * | 1/2011 | Baker et al. | 455/450 |
| 2013/0322565 | A1 * | 12/2013 | Rofougaran | 375/295 |
| 2014/0119468 | A1 * | 5/2014 | Huang et al. | 375/267 |

FOREIGN PATENT DOCUMENTS

| | | |
|---|---|---|
| KR | 10-2008-0043448 | 5/2008 |
| KR | 10-2008-0073399 | 8/2008 |

OTHER PUBLICATIONS

Chae, Chan-Byoung et al. “Coordinated Beamforming with Limited Feedback in the MIMO Broadcast Channel” IEEE Journal on Selected Areas in Communication, vol. 26, No. 8, Oct. 2008, pp. 1505-1515 (11 pages, in English).

Cadambe, Viveck R. et al. “Interference Alignment and Degrees of Freedom of the K User Interference Channel” Electrical Engineering and Computer Science, University of California Irvine, Presented in part at 45$^{th}$ Annual Allerton Conference on Communication, Control and Computing, 2007 (30 pages, in English).

Sung, Hakjea et al. “Linear Precoder Designs for K-user Interference Channels” IEEE Transactions on Wireless Communication, vol. 9, No. 1, Jan. 2010, pp. 291-301 (11 pages, in English.

Kiani, Saad G. et al. “Maximizing Multicell Capacity Using Distributed Power Allocation and Scheduling” IEEE, Wireless Communications and Networking Conference, 2007 (5 pages, in English).

* cited by examiner

METHOD AND APPARATUS OF SELECTING TRANSMISSION/RECEPTION MODE OF PLURAL TRANSMISSION/RECEPTION PAIRS

CROSS-REFERENCE TO RELATED APPLICATION(S)

This application claims the benefit under 35 U.S.C. §119 (a) of Korean Patent Application No. 10-2009-0084767, filed on Sep. 9, 2009, in the Korean Intellectual Property Office, the entire disclosure of which is incorporated herein by reference for all purposes.

BACKGROUND

1. Field

The following description relates to a technology that may handle or cancel interference occurring when transmission/reception pairs utilize the same radio resources, and more particularly, to a technology that may enhance a performance of a communication system regardless of an existence of interference.

2. Description of Related Art

A communication system including a plurality of cells where a data transmission rate and communication reliability may be enhanced have been and are being researched. The plurality of cells may include, for example, a cellular base station, a femto base station, a fixed base station or a mobile base station, a relay station, and terminal.

In the plurality of cells, a plurality of base stations may communicate with corresponding terminals using the same radio resource, for example, a frequency, a time, a code resource, and the like, in order to enhance a radio resource efficiency. However, interference may occur in each of terminals when the plurality of base stations uses the same radio resource. Overall throughput of the communication system may decrease due to the interference.

Accordingly, there is a desire for a technology that may maximize or improve a radio resource efficiency and also minimize or reduce a performance deterioration occurring due to interference.

SUMMARY

In one general aspect, a method of selecting a transmission/reception mode of transmission/reception pairs repeatedly using radio resources includes calculating an achievable sum data rate with respect to each of available candidate transmission/reception modes, selecting, from the available candidate transmission/reception modes, a transmission/reception mode to be applied based on the calculated achievable sum data rate, and processing information associated with the selected transmission/reception mode so that the transmission/reception pairs share information associated with the selected transmission/reception mode.

The calculating the achievable sum data rate may include calculating the achievable sum data rate with respect to each of the available candidate transmission/reception modes based on a number of available active links between the transmission/reception pairs, and available transmission powers corresponding to the available active links.

The selecting the transmission/reception mode may include determining a number of optimal active links maximizing the achievable sum data rate, and transmission powers corresponding to the optimal active links.

The method may further include managing a table that stores the available candidate transmission/reception modes with respect to a number of active links between the transmission/reception pairs, and available transmission powers corresponding to the active links.

The available transmission powers may fulfill a condition of limited total power and be discretely set. The number of available active links may be greater than or equal to 1, and be less than or equal to the number of transmission/reception pairs.

The available candidate transmission/reception modes may include at least one of a maximum ratio transmission mode, a coordinated beamforming mode, and an interference alignment mode.

In the interference alignment mode, each of the transmission/reception pairs may calculate a beamforming matrix and a decoding matrix according to a transformed minimum mean square error (MMSE) scheme using diagonal elements of a corresponding effective channel matrix.

In the maximum ratio transmission mode, each of the transmission/reception pairs may utilize, as a beamforming matrix, a matrix obtained through a signaler value decomposition (SVD) of a corresponding channel matrix.

The processing information may include processing information associated with an index of the selected transmission/reception mode.

A computer-readable storage medium may store a program to implement the method.

In another general aspect, an apparatus for selecting a transmission/reception mode of transmission/reception pairs repeatedly using radio resources includes a calculator configured to calculate an achievable sum data rate with respect to each of available candidate transmission/reception modes, a selector configured to select, from the available candidate transmission/reception modes, a transmission/reception mode to be applied based on the calculated achievable sum data rate, and a processor configured to process information associated with the selected transmission/reception mode so that the transmission/reception pairs share information associated with the selected transmission/reception mode.

The apparatus may further include a transfer unit configured to transfer information associated with the selected transmission/reception mode to at least one of the transmission/reception pairs.

The calculator may be configured to calculate the achievable sum data rate with respect to each of the available candidate transmission/reception modes based on a number of available active links between the transmission/reception pairs, and available transmission powers corresponding to the available active links.

The apparatus may further include a memory configured to manage a table that stores the available candidate transmission/reception modes with respect to a number of active links between the transmission/reception pairs, and available transmission powers corresponding to the active links, and an information gathering unit configured to gather information associated with channels formed between the transmission/reception pairs.

In still another general aspect, a method of operating a terminal included in transmission/reception pairs repeatedly using radio resources includes receiving information associated with a transmission/reception mode to be applied that is selected based on an achievable sum data rate with respect to each of available candidate transmission/reception modes, generating a corresponding decoding matrix based on the selected transmission/reception mode, and decoding a received signal using the corresponding decoding matrix.

Information associated with the selected transmission/reception mode may include information associated with an index of the selected transmission/reception mode. The available candidate transmission/reception modes may include at least one of a maximum ratio transmission mode, a coordinated beamforming mode, and an interference alignment mode.

Other features and aspects will be apparent from the following detailed description, the drawings, and the claims.

Figure 1:
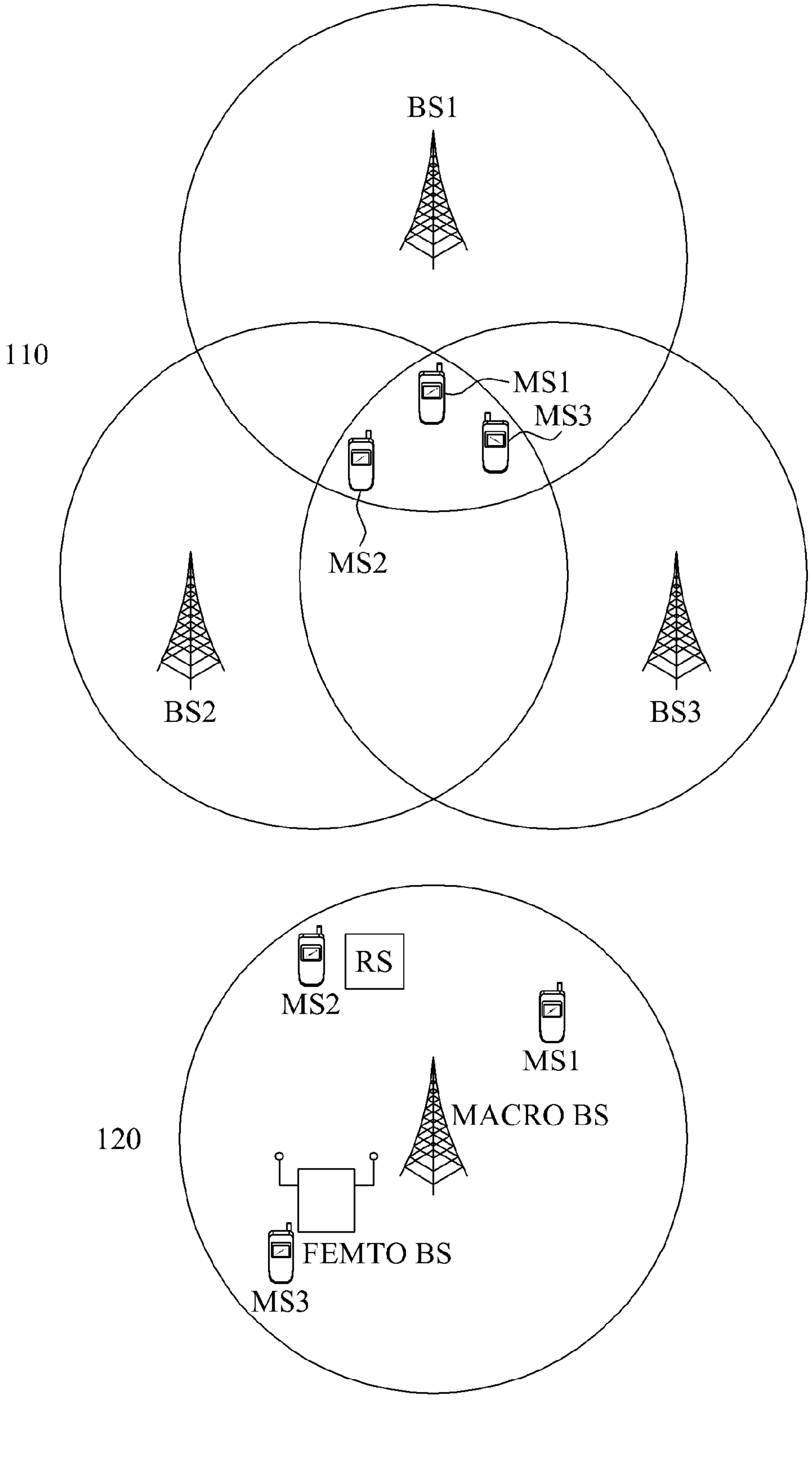
FIG. 1 is a diagram illustrating an example of a multi-cell communication system including transmission/reception pairs and a hierarchical cell communication system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates an example of a multi-cell communication system 110 including transmission/reception pairs and a hierarchical cell communication system 120.

Referring to the example shown in FIG. 1, the multi-cell communication system 110 includes three transmission/reception pairs. For example, the communication system 110 may include a base station 1 (BS1)-terminal 1 (MS1), a base station 2 (BS2)-terminal 2 (MS2), and a base station 3 (BS3)-terminal 3 (MS3).

The hierarchical cell communication system 120 includes three transmission/reception pairs. For example, the communication system 120 may include a macro base station-(MS1), a relay station (RS)-(MS2), and a femto base station-(MS3).

When the three transmission/reception pairs use the same radio resource, interference may occur in the three transmission/reception pairs. Accordingly, there is a desire for a technology that may cancel or handle the interference occurring in the transmission/reception pairs, or that may enhance a performance of a communication system regardless of the interference.

Figure 2:
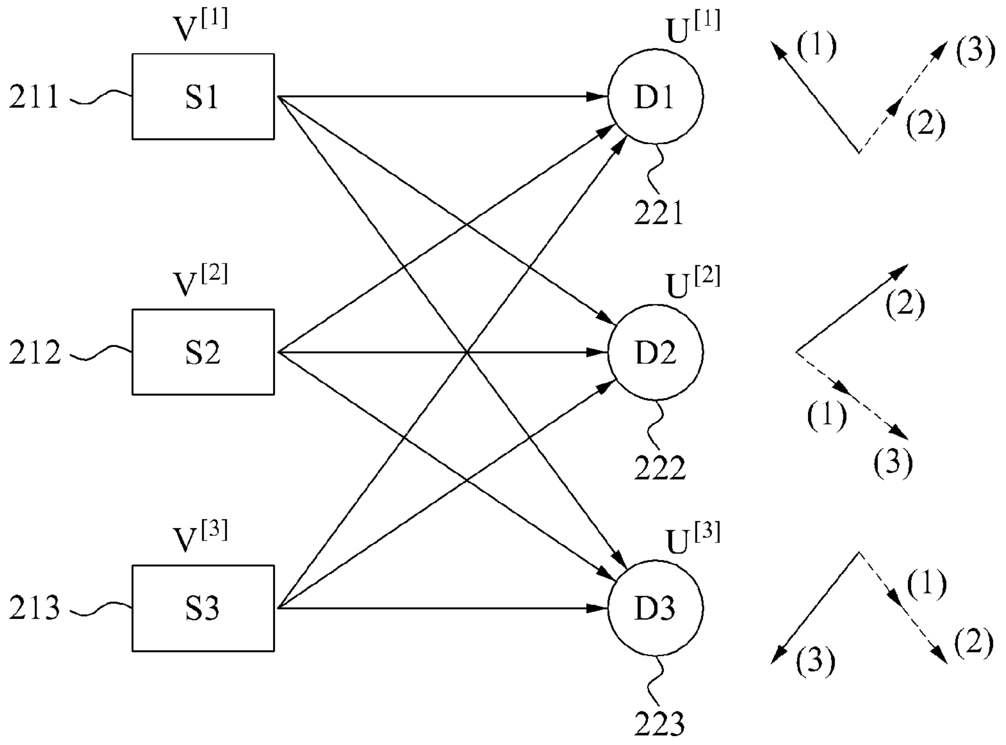
FIG. 2 is a diagram illustrating an example of transmission/reception pairs using an interference alignment scheme.

FIG. 2 illustrates an example of transmission/reception pairs using an interference alignment scheme.

Referring to FIG. 2, for example, a communication system or a communication network includes source nodes (S1, S2, and S3) 211, 212, and 213. Each of the source nodes (S1, S2, and S3) 211, 212, and 213 corresponds to each of destination nodes (D1, D2, and D3) 221, 222, and 223.

Each of the source nodes (S1, S2, and S3) 211, 212, and 213 denotes a data transmission device that includes, for example, a fixed base station, a mobile base station, a miniature base station such as a femto base station, a relay station, and the like. Each of the destination nodes (D1, D2, and D3) 221, 222, and 223 denotes a data reception device that includes, for example, a relay station, a fixed terminal, a mobile terminal, and the like.

When each of the source nodes (S1, S2, and S3) 211, 212, and 213 transmits data using the same radio resource, interference may occur in each of the destination nodes (D1, D2, and D3) 221, 222, and 223. For example, in the destination node (D1) 221, a signal of the source node (S1) 211 corresponds to a desired signal and signals of the source nodes (S2, S3) 212 and 213 correspond to interference. Similarly, interference may occur even in the destination nodes (D2, D3) 222 and 223. The above described interference may decrease a throughput of the communication system.

The decrease in the throughput caused by the interference may be prevented or reduced by using the interference alignment scheme. For example, the source nodes (S1, S2, and S3) 211, 212, and 213 may adjust a phase of a signal reasonably designed beamforming matrices $V^{[1]}$, $V^{[2]}$, and $V^{[3]}$, respectively. A signal of each of the source nodes (S1, S2, and S3) 211, 212, and 213 with the adjusted phase may be transmitted via channels. A received signal of each of the destination nodes (D1, D2, and D3) 221, 222, and 223 may be separated into a desired signal and unwanted interference.

For example, presume that arrow indicators (1), (2), and (3) of FIG. 2 denote a desire signal of the destination nodes (D1, D2, and D3) 221, 222, and 223, respectively. A received signal of the destination node (D1) 221 may be separated into a desired signal (1) of the destination node (D1) 221, and interference (2) and (3). A received signal of the destination node (D2) 222 may be separated into a desired signal (2) of the destination node (D2) 222, and interference (1) and (3). A received signal of the destination node (D3) 223 may be separated into a desired signal (3) of the destination node (D3) 223, and interference (1) and (2).

The destination nodes (D1, D2, and D3) 221, 222, and 223 may cancel or reduce the interference in the received signal to extract the desired signal using reasonably designed decoding matrices $U^{[1]}$, $U^{[2]}$, and $U^{[3]}$, respectively. For example, the source nodes (S1, S2, and S3) 211, 212, and 213 may use the reasonably designed beamforming matrices $V^{[1]}$, $V^{[2]}$, and $V^{[3]}$, respectively. The destination nodes (D1, D2, and D3) 221, 222, and 223 may use the reasonably designed decoding matrices $U^{[1]}$, $U^{[2]}$, and $U^{[3]}$, respectively. Through use of these matrices, it is possible to enhance the efficiency of the use of radio resources and to prevent or reduce a decrease in throughput of the communication system caused by interference.

Although an expression of the beamforming matrices $V^{[1]}$, $V^{[2]}$, and $V^{[3]}$ and the decoding matrices $U^{[1]}$, $U^{[2]}$, and $U^{[3]}$ is used here for ease of description, the beamforming matrices $V^{[1]}$, $V^{[2]}$, and $V^{[3]}$ and the decoding matrices $U^{[1]}$, $U^{[2]}$, and $U^{[3]}$ may be in a matrix or a vector form. For example, the beamforming matrices $V^{[1]}$, $V^{[2]}$, and $V^{[3]}$ and the decoding matrices $U^{[1]}$, $U^{[2]}$, and $U^{[3]}$ may have the form of a matrix or a vector according to a number of data streams of each of the source nodes (S1, S2, and S3) 211, 212, and 213.

Employing the interference alignment scheme may not always have a desired result. Employing the interference alignment scheme may greatly increase overhead of the communication system and may not enhance the throughput of the communication system. For example, in a low signal-to-noise ratio (SNR), it may be useful to use a time division multiple access (TDMA) scheme rather than the interference alignment scheme.

Accordingly, a technology that may select an optimal transmission/reception mode from candidate transmission/reception modes and use the selected optimal transmission/reception mode, instead of unconditionally using the interference alignment scheme is described below. For example, the candidate transmission/reception modes may include a maximum ratio transmission mode, a coordinated beamforming mode, and an interference alignment mode. In different examples, the optimal transmission/reception mode from the candidate transmission/reception modes may be selected. In particular, different examples may calculate an achievable sum data rate with respect to each of the candidate transmission/reception modes, and select the optimal transmission/reception mode from the candidate transmission/reception modes so that the calculated achievable sum data rate may be maximized.

Figure 3:
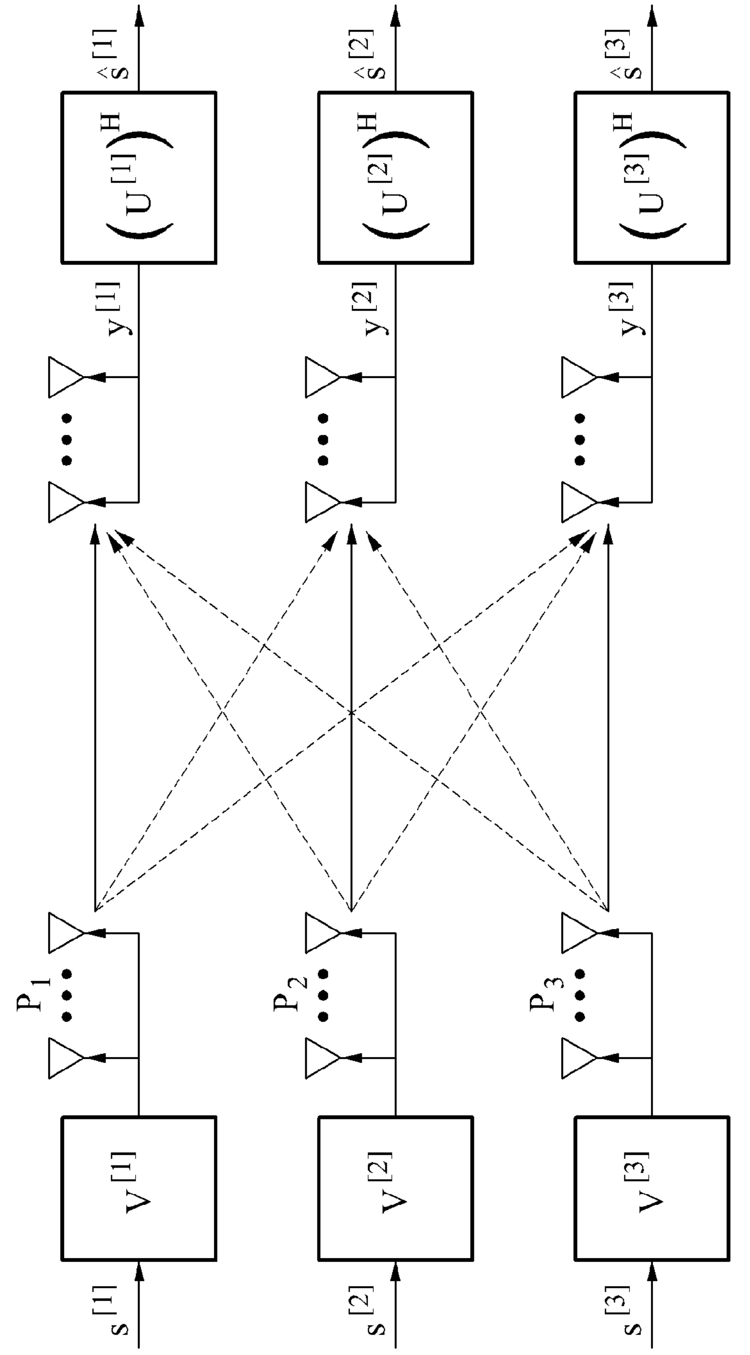
FIG. 3 is a diagram illustrating an example of transmission/reception pairs including multiple antennas.

FIG. 3 illustrates an example of transmission/reception pairs including multiple antennas.

Referring to the example in FIG. 3, three transmission/reception pairs exist, and at least two antennas are installed in all the transmitters and receivers. It may be presumed that a number M of antennas are installed in each of the receivers.

When a received signal vector of an $i^{th}$ receiver is $y^{[i]}$, the received signal vector $y^{[i]}$ may be expressed by the following Equation 1:

$$\begin{bmatrix} y^{[1]} \\ y^{[2]} \\ y^{[3]} \end{bmatrix} = \begin{bmatrix} H^{[11]} & H^{[12]} & H^{[13]} \\ H^{[21]} & H^{[22]} & H^{[23]} \\ H^{[31]} & H^{[32]} & H^{[33]} \end{bmatrix} \begin{bmatrix} V^{[1]}s^{[1]} \\ V^{[2]}s^{[2]} \\ V^{[3]}s^{[3]} \end{bmatrix} + \begin{bmatrix} n^{[1]} \\ n^{[2]} \\ n^{[3]} \end{bmatrix} \quad (1)$$

In this example, $$s^{[i]} \in C^{\frac{M}{2}}$$

denotes a data stream of the $i^{th}$ receiver, $y^{[i]} \in C^{M\times 1}$ denotes the received signal vector of the $i^{th}$ receiver, $H^{[ij]} \in C^{M\times M}$ denotes a channel matrix from a $j^{th}$ transmitter to the $i^{th}$ receiver, $$V^{[i]} \in C^{M\times \frac{M}{2}}$$

denotes a beamforming matrix of the $i^{th}$ receiver, and $n^{[i]} \in C^{M\times 1}$ denotes a Gaussian noise vector.

A sum data rate of the communication system may be enhanced by adjusting a power and a direction, for example, a phase of $V^{[i]}$, i=1, 2, 3 disclosed in the above Equation 1. Accordingly, the sum data rate of the communication system may be enhanced by determining beamforming matrices providing a high sum date rate among a set of all the available beamforming matrices fulfilling a condition for the total power, as given by the following Equation 2:

$$S = \left\{ (V^{[1]}, V^{[2]}, V^{[3]}) \,\middle|\, \sum_{k=1}^{3} \|V^{[k]}\|_F^2 = P \right\}, |S| = \infty \quad (2)$$

It can be known from the above Equation 2 that a set S to be determined for optimal beamforming matrices has a significantly large size. Accordingly, the size of the set S may be effectively reduced.

1. Binary Transmission Power Control

"Maximizing multi-cell capacity using distributed power allocation and scheduling," IEEE WCNC '07, S. G. Kiani, G. E. Oien, D. Gesbert (hereinafter, Kiani) may reduce the size of the set S of the above Equation 2 to the following Equation 3:

$$U = \left\{ (P_1, P_2, P_3) \,\middle|\, \sum_{i=1}^{3} P_i = P \right\}, \quad \text{with } |U| = \infty \quad (3)$$

$$\Downarrow$$

$$\overline{U} = \{(P_1, P_2, P_3) \mid P_i \in \{0, P_{max}^{[i]}\}, i = 1, 2, 3\}, \quad \text{with } |\overline{U}| = 7$$

In this example, $P_{max}^{[I]}$ denotes the maximum transmission power that may be used by an $i^{th}$ transmitter. The transmission power of the $i^{th}$ transmitter may be set to either zero or $P_{max}^{[I]}$. Accordingly, since available transmission powers of transmitters fulfill a condition of limited total power and are discretely set, the size of the set S disclosed in the above Equation 2 may be effectively reduced.

Referring to FIG. 3, since a maximum number of available active links is three, a set of all the available transmission powers may be expressed by Table 1 as below. When the $i^{th}$ transmitter uses a transmission power of $P_{max}^{[g]}$, a link between the $i^{th}$ transmitter and the $i^{th}$ receiver may correspond to an active link. When the $i^{th}$ transmitter uses a transmission power of zero, the link between the $i^{th}$ transmitter and the $i^{th}$ receiver may not correspond to an active link.

TABLE 1

| Number of active links | Available transmission powers | Actual transmission power to be applied (total power = p) |
|---|---|---|
| 1 | $(P_{max}^{[1]}, 0, 0)$ | (P, 0, 0) |
| | $(0, P_{max}^{[2]}, 0)$ | (0, P, 0) |
| | $(0, 0, P_{max}^{[3]})$ | (0, 0, P) |
| 2 | $(P_{max}^{[1]}, P_{max}^{[2]}, 0)$ | (P/2, P/2, 0) |
| | $(P_{max}^{[1]}, 0, P_{max}^{[3]})$ | (P/2, 0, P/2) |
| | $(0, P_{max}^{[2]}, P_{max}^{[3]})$ | (0, P/2, P/2) |
| 3 | $(P_{max}^{[1]}, P_{max}^{[2]}, P_{max}^{[3]})$ | (P/3, P/3, P/3) |

2. Pareto Boundary

Referring to "Complete characterization of the pareto boundary for the MISO Interference Channel," IEEE Trans. Sig. Proc., October 2008. E. A. Jorswieck and et al. (hereinafter, Jorswieck), the direction of optimized beamforming matrices may be expressed by the following Equation 4:

$$V_{opt}^{[i]} \propto \alpha_i V_{ZF}^{[i]} + (1+\alpha_i) V_{MRT}^{[i]},\ 0 \le \alpha_i \le 1 \quad (4)$$

To decrease a complexity, only $\alpha_i \in \{0,1\}$ is considered in the above Equation 4. In addition, $(\alpha_1, \alpha_2, \alpha_3)=(0, 0, 0)$ or $(\alpha_1, \alpha_2, \alpha_3)=(1, 1, 1)$ may be considered. When $(\alpha_1, \alpha_2, \alpha_3)=(0, 0, 0)$, all the transmission/reception pairs may use the maximum ratio transmission mode. When $(\alpha_1, \alpha_2, \alpha_3)=(1, 1, 1)$, all the transmission/reception pairs may use a known coordinated beamforming mode.

3. Transmission/Reception Mode (1) Maximum Ratio Transmission Mode:

A transmitter may obtain beamforming matrices based on only a channel of the transmitter, excluding interference caused by other transmitters. In a low SNR, since noise may be relatively great compared to the interference caused by the other transmitters, the maximum ratio transmission mode may be more effective.

In the maximum ratio transmission mode, the beamforming matrices may be obtained by the following Equation 5:

$$\begin{aligned} V^{[1]} &\leftarrow \text{first } \frac{M}{2} \text{ right singular vectors of } H^{[11]} \\ V^{[2]} &\leftarrow \text{first } \frac{M}{2} \text{ right singular vectors of } H^{[22]} \\ V^{[3]} &\leftarrow \text{first } \frac{M}{2} \text{ right singular vectors of } H^{[33]} \end{aligned} \quad (5)$$

In the maximum ratio transmission mode, each of the transmitters may perform a singular value decomposition (SVD) for its channel matrix, and may constitute a beamforming matrix using M/2 right singular vectors.

The above Equation 5 shows a process of constituting beamforming matrices when three links correspond to active links. Beamforming vectors may be constituted even when a number of active links is one or two.

(2) Coordinated Beamforming Mode:

The coordinated beamforming mode may be applicable to a case where a number of active links is two.

"Coordinated beamforming with limited feedback in the MIMO Broadcast Channel," *IEEE JSAC,* 26(8), October 2008. C.-B. Chae et al. (also referred to as "Chae") is directed a process of obtaining an optimal beamforming vector, for example, a zero-forcing beamforming vector according to a known coordinated beamforming mode.

When M=2, the optimal beamforming vector, for example, the zero-forcing beamforming vector may be expressed by the following Equation 6:

$$\left(\hat{v}^{[1]}, \hat{v}^{[2]}\right) = \arg \max_{\substack{v^{[1]} \in \{e_1, e_2\} \\ v^{[2]} \in \{f_1, f_2\}}} R_\Sigma(v^{[1]}, v^{[2]}) \quad (6)$$

$e_1, e_2$: generalized eigenvectors of $R^{[21]}, R^{[12]H}$ $f_1, f_2$: generalized eigenvectors of $R^{[12]}, R^{[21]H}$ In this example, $R^{[ij]} \triangleq H^{[ii]H} H^{[ij]}$ $R_\Sigma(v^{[1]}, v^{[2]})$ denotes an achievable sum data rate when the beamforming matrices include $(v^{[1]}, v^{[2]})$.

As known from the above Equation 6, the optimal beamforming vector may be obtained from four combinations as given by the following Equation 7:

$$(v^{[1]}, v^{[2]}) \in \{(e_1, f_1), (e_1, f_2), (e_2, f_1), (e_2, f_2)\} \quad (7)$$

When M=4, a similar scheme to a scheme applied to the case where M=2 may be applied. In this case, the optimal beamforming matrix may be obtained as given by the following Equation 8:

$$\left(\hat{V}^{[1]}, \hat{V}^{[2]}\right) = \arg \max_{\substack{V^{[1]} \in E \\ V^{[2]} \in F}} R_\Sigma(V^{[1]}, V^{[2]}) \quad (8)$$

$E = \{[e_i\ e_j] \mid i \ne j,\ 1 \le i, j \le 4\}$ $F = \{[f_i\ f_j] \mid i \ne j,\ 1 \le i, j \le 4\}$ $e_1, e_2, e_3, e_4$: generalized eigenvectors of $R^{[21]}$, R[12]H $f_1, f_2, f_3, f_4$: generalized eigenvectors of $R^{[21]}$, R[12]H In this example, $R^{[ij]} \triangleq H^{[ii]H} H^{[ij]}$ Referring to the above Equation 8, the optimal beamforming matrix may be determined from 36 combinations.

(3) Enhanced Interference Alignment Mode and Transformed Minimum Mean Square Error (MMSE)-Based Interference Alignment Mode:

When a number of active links is three, the enhanced interference alignment mode and the transformed MMSE-based interference alignment mode may be applied.

The enhanced interference alignment mode is described below.

Beamforming matrices may be expressed by the following Equation 9:

$$V^{[i]} = Q(B^{[i]}) W^{[i]},\ i=1,2,3 \quad (9)$$

In this example, Q(X) may apply orthonormal basis vectors of Span(X) as column vectors. For example, Q(X) may include the orthonormal basis vectors of Span(X) as the column vectors. Since $$B^{[i]} \in \mathbb{C}^{M \times \frac{M}{2}}$$

determines span($V^{[i]}$), it is possible to adjust a vector space.

$$W^{[i]} \in \mathbb{C}^{\frac{M}{2} \times \frac{M}{2}}$$

may function to determine optimal basis vectors within a given vector space.

A scheme of determining optimal $W^{[i]}$ with respect to given $B^{[i]}$ is discussed in "Linear precoding and decoding methods for K-user interference channel systems," in revision for publication in *IEEE Trans. Trans. WC.*, H. Sung et al. (also referred to as "Sung").

Optimal $B^{[i]}$ may be determined using the following Equation 10:

$$B^{[1]} = [e_{i^*_1} \ldots e_{i^*_{M/2}}],\ B^{[2]} = FB^{[1]},\ B^{[3]} = GB^{[1]} \quad (10)$$

In this example, E, F, and G are well described in "Interference alignment and degrees of freedom of the user interference channel", *IEEE Trans. IT,* 54(8), August 2008. V. R. Cadambe and S. A. Jafar (hereinafter, "Cadambe"), and $e_1, \ldots, e_m$ denote M eigen vectors of E.

$i^*_1, \ldots, i^*_{M/2}$ may be obtained using the following Equation 11:

$$(i^*_1, \ldots, i^*_{M/2}) = \arg \max_{1 \le i_1 < \ldots < i_{M/2} \le M} R_\Sigma\left(B^{[1]} = [e_{i_1} \cdots e_{i_{M/2}}],\ B^{[2]} = FB^{[1]},\ B^{[3]} = GB^{[1]}\right) \quad (11)$$

In this example, $R_\Sigma(B^{[1]}, B^{[2]}, B^{[3]})$ denotes an achievable sum data rate when optimized $W^{[1]}, W^{[2]}, W^{[3]}$ are applied to $B^{[1]}$, $B^{[2]}$, $B^{[3]}$. In the enhanced interference alignment mode, the transmitters may determine the beamforming vectors using the above Equation 9 through Equation 11.

In the transformed MMSE-based interference alignment mode, $V^{[i]}$, $U^{[i]}$ may be obtained to minimize a total square error function, as given by the following Equation 12:

$$\min_{V^{[k]},U^{[k]}} \sum_{k=1}^{K} E\left[\left\|\Lambda^{[k]}s^{[k]} - \hat{s}^{[k]}\right\|^2\right] \quad (12)$$

$$\text{subject to } \sum_{k=1}^{K} tr(V^{[k]}V^{[k]H}) = P$$

In this example, $\Lambda^{[k]}$ denotes a diagonal matrix including diagonal elements of an effective channel matrix obtained when the above Equation 9 through Equation 11 are applied according to the above described enhanced interference alignment mode.

It may be known from the above Equation 12 that the existing MMSE scheme is slightly transformed due to an insertion of $\Lambda^{[k]}$. $V^{[i]}$, $U^{[i]}$ may be obtained using the above Equation 12.

4. Combination of Binary Transmission Power Control and Pareto Boundary:

By combining the above described binary transmission power control of item 1 and pareto boundary of item 2, Table 2 and Table 3 may be obtained as follows:

TABLE 2

<M = 2>

| Number of active links | Transmission power | Transmission/reception mode |
|---|---|---|
| 1 | (P, 0, 0) | MRT |
| | (0, P, 0) | MRT |
| | (0, 0, P) | MRT |
| 2 | (P/2, P/2, 0) | MRT<br>Coordinated beamforming (4 candidates) |
| | (P/2, 0, P/2) | MRT<br>Coordinated beamforming (4 candidates) |
| | (0, P/2, P/2) | MRT<br>Coordinated beamforming (4 candidates) |
| 3 | (P/3, P/3, P/3) | MRT<br>Enhanced interference alignment<br>Transformed MMSE-based interference alignment |

TABLE 3

<M = 4>

| Number of active links | Transmission power | Transmission/reception mode |
|---|---|---|
| 1 | (P, 0, 0) | MRT |
| | (0, P, 0) | MRT |
| | (0, 0, P) | MRT |
| 2 | (P/2, P/2, 0) | MRT<br>Coordinated beamforming (4 candidates) |
| | (P/2, 0, P/2) | MRT<br>Coordinated beamforming (4 candidates) |
| | (0, P/2, P/2) | MRT<br>Coordinated beamforming (4 candidates) |
| 3 | (P/3, P/3, P/3) | MRT<br>Enhanced interference alignment<br>Transformed MMSE-based interference alignment |

As addressed in the above Table 2 and Table 3, an achievable sum data rate may be calculated with respect to each of transmission/reception modes, for example, each of candidate transmission/reception modes based on a number of active links and transmission powers assigned to the active links. A candidate transmission/reception mode of which the calculated achievable sum data rate is maximum may be selected. MRT denotes the maximum ratio transmission mode.

Figure 4:
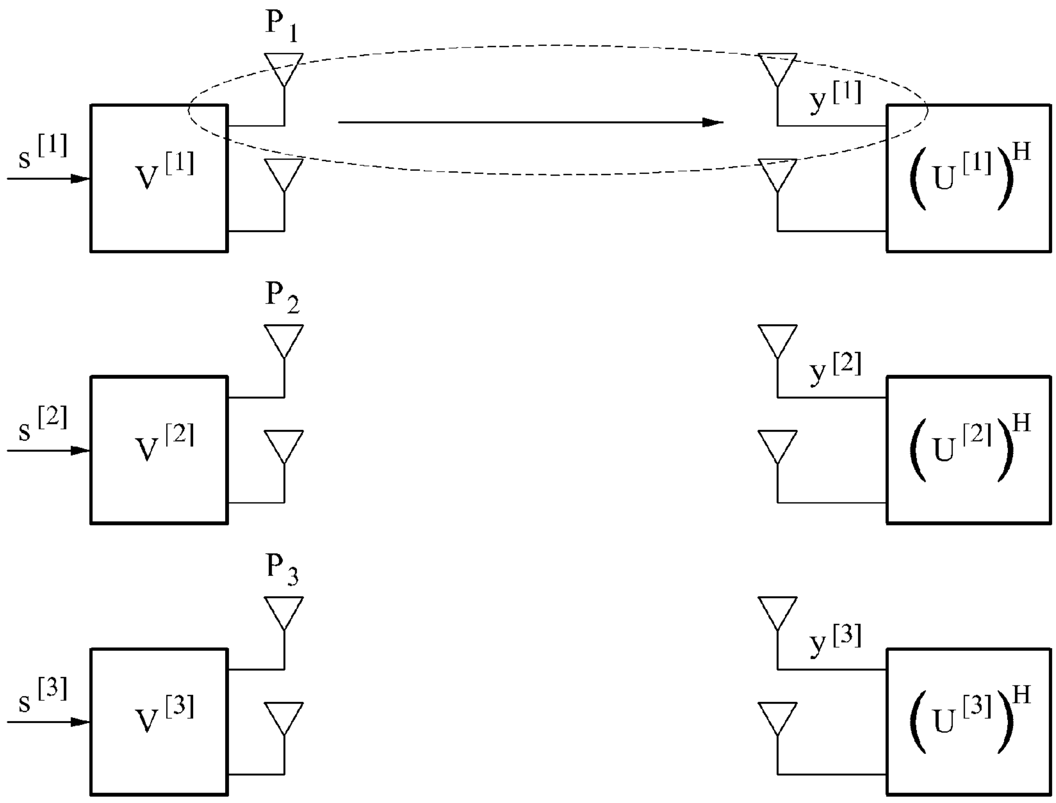
FIG. 4 is a diagram illustrating an example where a single active link exists between transmission/reception pairs.

FIG. 4 illustrates an example where a single active link exists between transmission/reception pairs.

Since only the single active link exists, only a first base station may become active as shown in FIG. 4. However, the example in FIG. 4 is not limiting, and either a second base station or a third base station may become active.

In this example, a transmission/reception mode selecting apparatus may calculate a sum data rate corresponding to a candidate transmission/reception mode based on a transmission power by referring to Table 4 below. Information associated with channels to be utilized, for example, information associated with desired channels or interference channel may be gathered in advance and be utilized to calculate the sum data rate.

TABLE 4

| Number of active links | Transmission power | Transmission/reception mode |
|---|---|---|
| 1 | (P, 0, 0) | MRT |
| | (0, P, 0) | MRT |
| | (0, 0, P) | MRT |

Accordingly, the transmission/reception mode selecting apparatus may calculate the sum data rate corresponding to each of cases disclosed in the above Table 4, and may determine a candidate transmission/reception mode and a transmission power corresponding to a maximum sum data rate.

Figure 5:
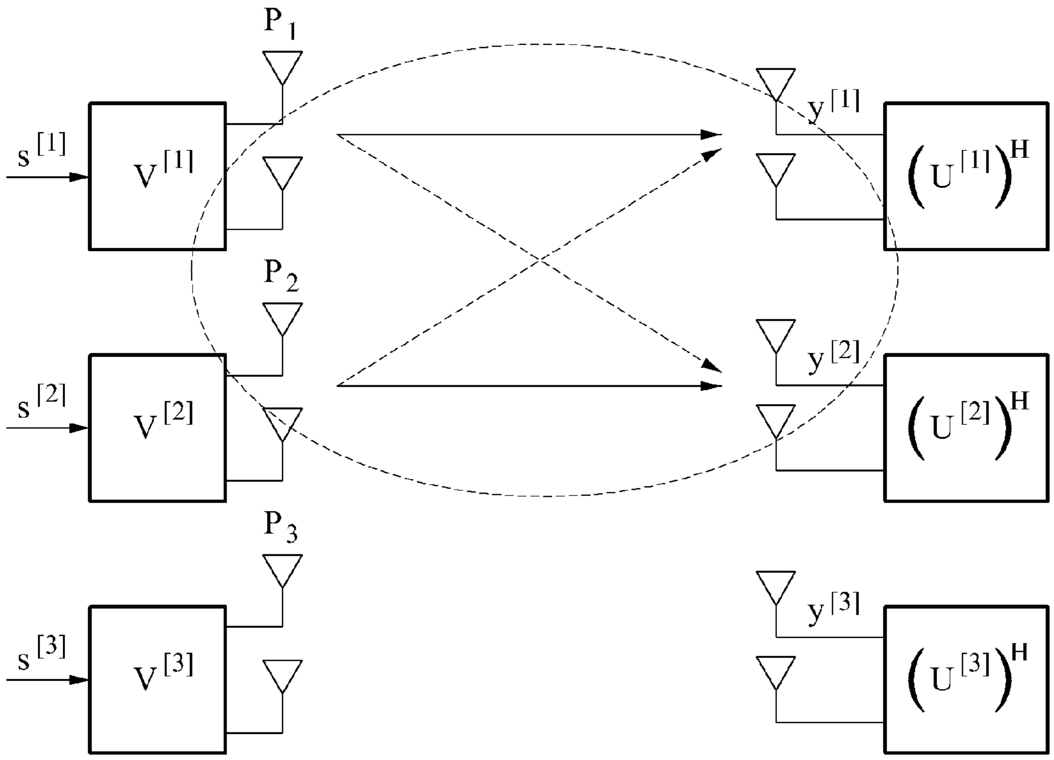
FIG. 5 is a diagram illustrating an example where two active links exist between transmission/reception pairs.

FIG. 5 illustrates an example where two active links exist between transmission/reception pairs.

Since two active links exist, a first base station and a second base station may become active as shown in FIG. 5. However, the example in FIG. 5 is not limiting, and either the first base station and a third base station may become active, or the second base station and the third base station may become active.

In this example, the transmission/reception mode selecting apparatus may calculate a sum data rate corresponding to each of cases disclosed in Table 5 below, and may determine a candidate transmission/reception mode and a transmission power corresponding to a maximum sum data rate.

TABLE 5

| Number of active links | Transmission power | Transmission/reception mode |
|---|---|---|
| 2 | (P/2, P/2, 0) | MRT<br>Coordinated beamforming<br>(4 candidates) |
| | (P/2, 0, P/2) | MRT<br>Coordinated beamforming<br>(4 candidates) |
| | (0, P/2, P/2) | MRT<br>Coordinated beamforming<br>(4 candidates) |

When one of the available transmission powers and one of the candidate transmission/reception modes disclosed in the above Table 5 are selected as the transmission/reception mode to be applied, information associated with the selected transmission/reception mode may be shared by the transmission/reception pairs. For example, information associated with an index of the selected transmission/reception mode may be shared by the transmission/reception pairs.

Figure 6:
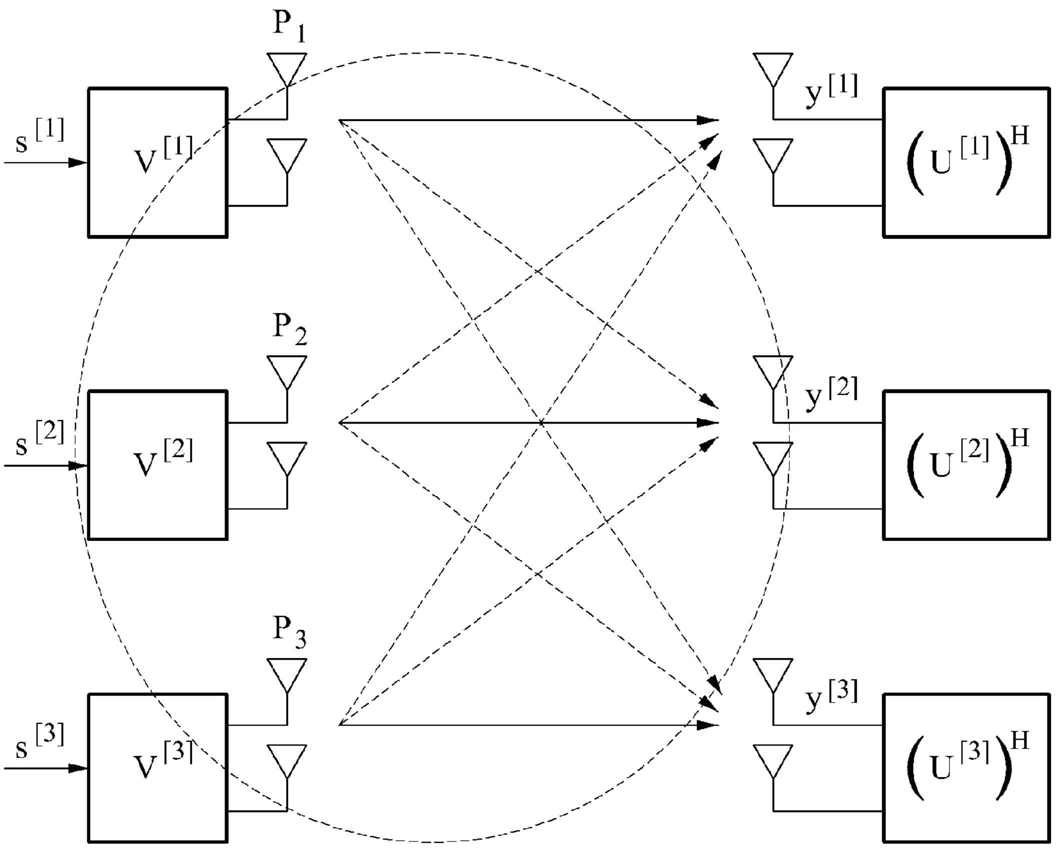
FIG. 6 is a diagram illustrating an example where three active links exist between transmission/reception pairs.

FIG. 6 illustrates an example where three active links exists between transmission/reception pairs.

Since three active links exist, a total transmission power may be equally distributed to all the base stations as shown in Table 6 below. In this example, the transmission/reception mode selecting apparatus may calculate a sum data rate with respect to each of candidate transmission/reception modes, and may determine an optimal transmission/reception mode.

TABLE 6

| Number of active links | Transmission power | Transmission/reception mode |
|---|---|---|
| 3 | (P/3, P/3, P/3) | MRT<br>Enhanced interference alignment<br>Transformed MMSE-based interference alignment |

Figure 7:
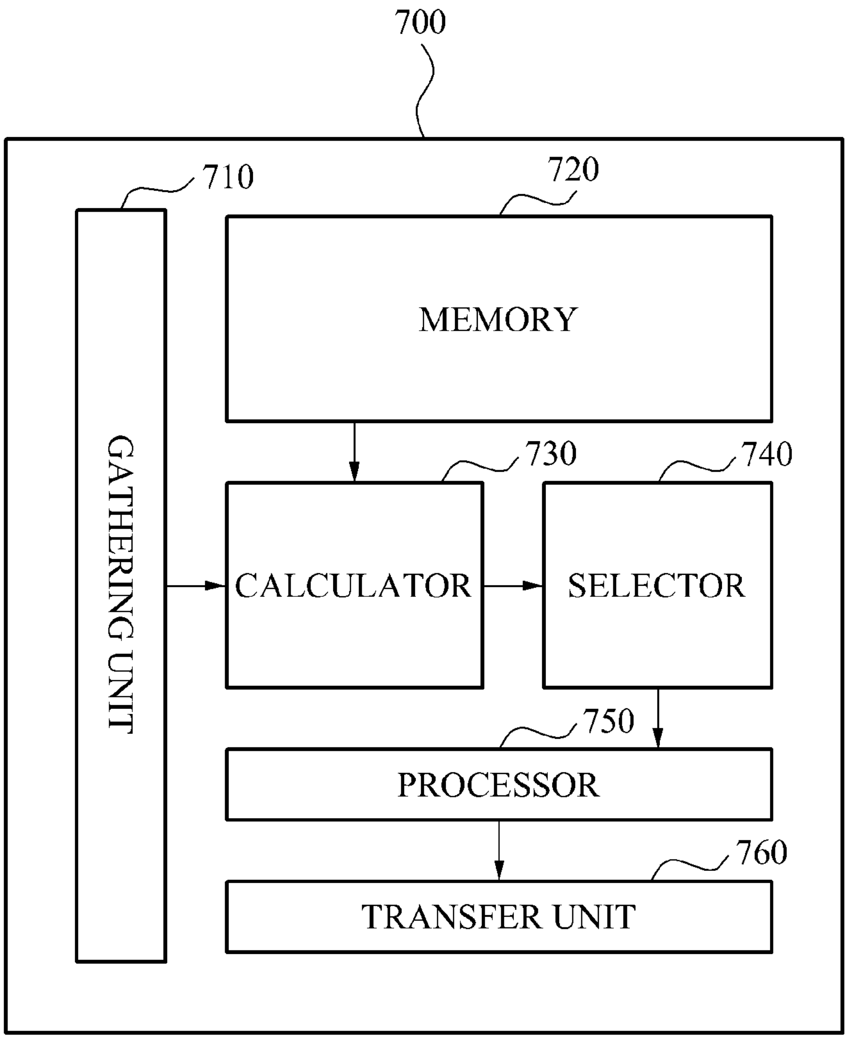
FIG. 7 is a diagram illustrating an example of an apparatus for selecting a transmission/reception mode of transmission/reception pairs.

FIG. 7 illustrates an example of an apparatus 700 for selecting a transmission/reception mode of transmission/reception pairs.

Referring to FIG. 7, for example, the transmission/reception mode selecting apparatus 700 includes a gathering unit 710, a memory 720, a calculator 730, a selector 740, a processor 750, and a transfer unit 760.

The gathering unit 710 may gather information associated with channels formed between the transmission/reception pairs. The gathering unit 710 may obtain, from one base station, information associated with all the channels, and may receive, from each base station, information associate with a corresponding channel.

The memory 720 may manage a table that stores the available candidate transmission/reception modes with respect to a number of active links between the transmission/reception pairs, and available transmission powers corresponding to the active links.

The available candidate transmission/reception modes may include at least one of a maximum ratio transmission mode, a coordinated beamforming mode, and an interference alignment mode.

In the interference alignment mode, each of the transmission/reception pairs may calculate a beamforming matrix and a decoding matrix according to a transformed MMSE scheme using diagonal elements of a corresponding effective channel matrix.

In the maximum ratio transmission mode, each of the transmission/reception pairs may utilize, as a beamforming matrix, a matrix obtained through an SVD of a corresponding channel matrix.

The calculator 730 may calculate an achievable sum data rate with respect to each of available candidate transmission/reception modes. For example, the calculator 730 may calculate the achievable sum data rate with respect to each of the available candidate transmission/reception modes based on a number of available active links between the transmission/reception pairs, and available transmission powers corresponding to the available active links. Information associated with the channels formed between the transmission/reception pairs may be utilized to calculate the achievable sum data rate with respect to each of the candidate transmission/reception modes.

The selector 740 may select, from the available candidate transmission/reception modes, a transmission/reception mode to be applied based on the calculated achievable sum data rate. For example, the selector 740 may determine a number of optimal active links maximizing the achievable sum data rate, and transmission powers corresponding to the optimal active links.

The processor 750 may process information associated with the selected transmission/reception mode so that the transmission/reception pairs may share information associated with the selected transmission/reception mode. For example, the processor 750 may process information associated with an index of the selected transmission/reception mode.

When the transmission/reception mode to be applied is selected, information associated with the selected transmission/reception mode may be provided to terminals. Each of the terminals may generate a corresponding decoding matrix based on information associated with the selected transmission/reception mode, and may decode a received signal using the corresponding decoding matrix.

Figure 8:
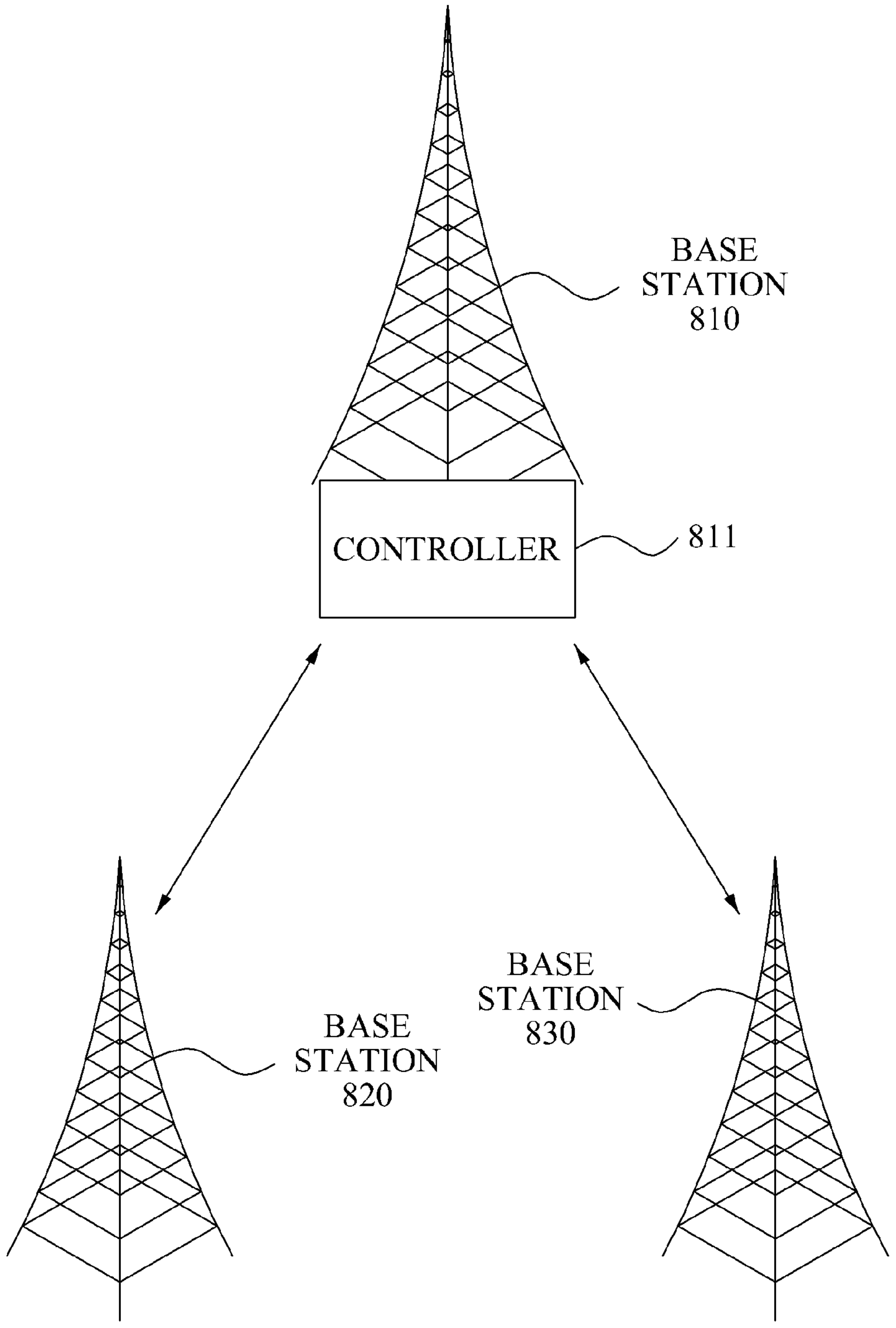
FIG. 8 is a diagram illustrating an example where a controller including a transmission/reception mode selecting apparatus is installed in a single base station.

FIG. 8 illustrates an example where a controller 811, including a transmission/reception mode selecting apparatus, is installed in a single base station 810.

As shown in FIG. 8, the controller 811 including the transmission/reception mode selecting apparatus may be installed in the base station 810. The base station 810 may gather information associated with all channels, and select a transmission/reception mode to be applied, and may transmit information associated with the selected transmission/reception mode to base stations 820 and 830, or to other terminals (not shown).

Figure 9:
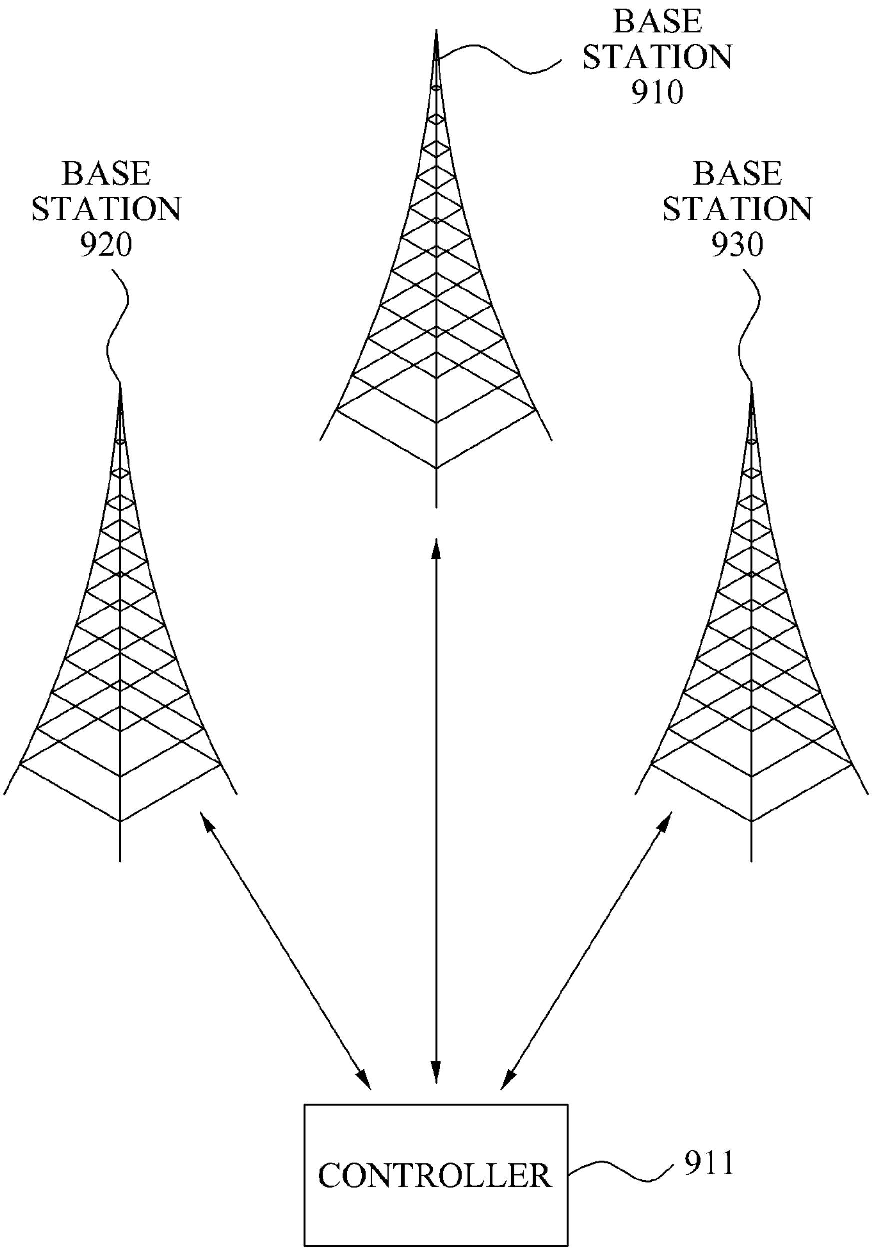
FIG. 9 is a diagram illustrating an example where a controller including a transmission/reception mode selecting apparatus is separated from base stations.

FIG. 9 illustrates an example where a controller 911 including a transmission/reception mode selecting apparatus is separated from base stations 910, 920, and 930.

As shown in FIG. 9, the controller 911 including the transmission/reception mode selecting apparatus may be independently provide to be separated from the base stations 910, 920, and 930.

In this example, the controller 911 may gather information associated with all channels formed between the transmission/reception pairs, and select a transmission/reception mode to be applied, and share information associated with the selected transmission/reception mode with the transmission/reception pairs.

In the above examples, it may be possible to maximize or increase a sum data rate in a given environment by calculating an achievable sum data rate with respect to each of available candidate transmission/reception modes, and by selecting an optimal transmission/reception mode based on the calculated achievable sum data rate.

Also, in the examples above, it may be possible to determine a number of optimal transmission/reception mode, a number of optimal active links, and transmission powers corresponding to the optimal active links by calculating an achievable sum data rate with respect to each of available candidate transmission/reception modes based on a number of available active links between transmission/reception pairs and available transmission powers corresponding to the available active links.

The processes, functions, methods and/or software described above including a method of selecting a transmission/reception mode of transmission/reception pairs may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of selecting a transmission/reception mode of transmission/reception pairs repeatedly using radio resources, the method comprising:

calculating an achievable sum data rate with respect to each of available candidate transmission/reception modes;

selecting, from the available candidate transmission/reception modes, a transmission/reception mode to be applied based on the calculated achievable sum data rate; and processing information of the selected transmission/reception mode such that the transmission/reception pairs share information of the selected transmission/reception mode, wherein each transmission/reception pair comprises a source node configured to transmit data and a destination node configured to receive the data and the source node and destination node of one transmission/reception pair are not shared with the other transmission/reception pairs; and wherein the calculating the achievable sum data rate comprises calculating the achievable sum data rate with respect to each of the available candidate transmission/reception modes based on a number of available active links between the transmission/reception pairs, and available transmission powers corresponding to the available active links.

2. The method of claim 1, wherein the selecting the transmission/reception mode comprises determining a number of optimal active links maximizing the achievable sum data rate, and transmission powers corresponding to the optimal active links.

3. The method of claim 1, further comprising:

managing a table that stores the available candidate transmission/reception modes with respect to a number of active links between the transmission/reception pairs, and available transmission powers corresponding to the active links.

4. The method of claim 1, wherein the available transmission powers fulfill a condition of limited total power and are discretely set.

5. The method of claim 1, wherein the number of available active links is greater than or equal to 2, and is less than or equal to the number of transmission/reception pairs.

6. The method of claim 1, wherein the available candidate transmission/reception modes comprise at least one of: a maximum ratio transmission mode, a coordinated beamforming mode, and an interference alignment mode.

7. The method of claim 6, wherein, in the interference alignment mode, each of the transmission/reception pairs calculates a beamforming matrix and a decoding matrix according to a transformed minimum mean square error (MMSE) scheme using diagonal elements of a corresponding effective channel matrix.

8. The method of claim 5, wherein, in the maximum ratio transmission mode, each of the transmission/reception pairs utilizes, as a beamforming matrix, a matrix obtained through a singular value decomposition (SVD) of a corresponding channel matrix.

9. The method of claim 1, wherein the processing information comprises processing information of an index of the selected transmission/reception mode.

10. A non-transitory computer-readable storage medium storing a program, when executed by a processor, allows the processor to implement the method of claim 1.

11. The method of claim 1, wherein the sum data rate is enhanced by adjusting a power and a direction between the transmission/reception pairs.

12. The method of claim 1, wherein the transmission mode is selected from among a candidate group of transmission modes which includes each of a maximum ratio transmission mode, a coordinated beamforming mode, and an interference alignment mode.

13. An apparatus for selecting a transmission/reception mode of transmission/reception pairs repeatedly using radio resources, the apparatus comprising:

a calculator configured to calculate an achievable sum data rate with respect to each of available candidate transmission/reception modes;

a selector configured to select, from the available candidate transmission/reception modes, a transmission/reception mode to be applied based on the calculated achievable sum data rate; and a processor configured to process information of the selected transmission/reception mode such that the transmission/reception pairs share information of the selected transmission/reception mode, wherein each transmission/reception pair comprises a source node configured to transmit data and a destination node configured to receive the data and the source node and the destination node of one transmission/reception pair are not shared with the other transmission/reception pairs, and wherein the calculator is further configured to calculate the achievable sum data rate with respect to each of the available candidate transmission/reception modes based on a number of available active links between the transmission/reception pairs, and available transmission powers corresponding to the available active links.

14. The apparatus of claim 13, further comprising a transfer device configured to transfer information of the selected transmission/reception mode to at least one of the transmission/reception pairs.

15. The apparatus of claim 13, further comprising a memory configured to manage a table configured to store the available candidate transmission/reception modes with respect to a number of active links between the transmission/reception pairs, and available transmission powers corresponding to the active links.

16. The apparatus of claim 15, further comprising an information gathering device configured to gather information of channels formed between the transmission/reception pairs.

* * * * *